United States Patent
O'Keeffe

(10) Patent No.: US 9,926,709 B1
(45) Date of Patent: Mar. 27, 2018

(54) MECHANISM FOR SUPPORTING AND POSITIONING A GLASS FLOOR UNIT

(71) Applicant: William F. O'Keeffe, Brisbane, CA (US)

(72) Inventor: William F. O'Keeffe, Brisbane, CA (US)

( * ) Notice: Subject to any disclaimer, the term of this patent is extended or adjusted under 35 U.S.C. 154(b) by 0 days.

(21) Appl. No.: 15/200,956

(22) Filed: Jul. 1, 2016

(51) Int. Cl.
*E04B 2/82* (2006.01)
*E04F 21/20* (2006.01)
*E04B 5/46* (2006.01)
*E04B 5/10* (2006.01)
*E04B 1/94* (2006.01)

(52) U.S. Cl.
CPC ............. *E04F 21/20* (2013.01); *E04B 1/942* (2013.01); *E04B 5/10* (2013.01); *E04B 5/46* (2013.01)

(58) Field of Classification Search
CPC . E04B 2/88; E04B 2/90; E04B 1/4157; E04B 1/4114; E04B 1/4121; E04B 1/4128; E04B 1/4135; E04B 5/00; E04B 2/885; E04B 2001/405; E04F 13/23; E04F 13/22; E04F 13/21; E04F 13/25; E04F 2015/02061; E04F 2015/02066; E04F 2015/02127; F16B 5/0233; F16B 5/0225; F16B 5/0216
USPC .. 52/125.5, 126.1, 126.4, 126.6, 126.7, 235, 52/745.21, 264, 236.6; 248/499, 670; 411/924; 403/301, 300
See application file for complete search history.

(56) References Cited

U.S. PATENT DOCUMENTS

| | | | | |
|---|---|---|---|---|
| 4,108,407 A | * | 8/1978 | Cable | F16B 5/0233 248/188.4 |
| 4,854,844 A | * | 8/1989 | Carlsen | B29C 47/165 264/40.1 |
| 5,387,080 A | * | 2/1995 | Bouhennicha | F01D 17/162 415/150 |
| 8,556,559 B2 | * | 10/2013 | Hsieh | F16B 39/02 411/133 |
| 9,285,067 B2 | * | 3/2016 | Hooghart | F16M 7/00 |
| 2002/0176739 A1 | * | 11/2002 | Goto | F16B 5/0233 403/301 |
| 2005/0050818 A1 | * | 3/2005 | Chen | E04F 15/02476 52/263 |
| 2006/0193714 A1 | * | 8/2006 | Werner | B23P 19/04 411/546 |
| 2006/0260462 A1 | * | 11/2006 | Stanford | B66F 3/30 92/15 |
| 2013/0291479 A1 | * | 11/2013 | Schaefer | F24J 2/5245 52/745.21 |
| 2014/0157699 A1 | * | 6/2014 | Moeller | E04B 2/88 52/235 |
| 2014/0166845 A1 | * | 6/2014 | Hooghart | F16M 7/00 248/670 |
| 2017/0016526 A1 | * | 1/2017 | Watarai | F16H 57/025 |

\* cited by examiner

*Primary Examiner* — Chi Q Nguyen
(74) *Attorney, Agent, or Firm* — Theodore J. Bielen, Jr.

(57) ABSTRACT

A mechanism for supporting and positioning a glass floor unit relative to a base utilizing a support positioned to contact the glass floor unit. An adjuster interacts with a receiver fixed to the base. The adjuster includes a contact element which moves the support and exerts a force against the glass floor unit in an upward direction.

12 Claims, 4 Drawing Sheets

MECHANISM FOR SUPPORTING AND POSITIONING A GLASS FLOOR UNIT

CROSS-REFERENCES TO RELATED APPLICATIONS

The present application claims the benefit of U.S. Provisional Application Ser. No. 62/188,046, filed 2 Jul. 2015, which is incorporated by reference, as a whole hereto.

SUMMARY OF THE INVENTION

In accordance with the present application, a novel and useful mechanism for supporting and positioning a glass floor unit relative to a base is herein provided.

The mechanism of the present application includes a receiver. The receiver is fixed to the base which may include metallic elements. In such a situation, the receiver may also be metallic and be fixed to the base metallic member by welding or other fastening means.

In addition, the mechanism of the present application is utilized with a support that is positioned to contact the glass floor unit, specifically the relatively durable laminated glass portion adjacent the upper surface of the glass floor unit. The support may take the form of a sheet and be rotatable into and out of a cavity which may be formed in the glass floor unit. In this manner, the support may be easily installed and later activated for proper functioning.

An adjuster is also found in the present mechanism and is configured to interact with the receiver. Such interaction may take the form of the receiver having a threaded portion which threadingly engages a threaded portion of the adjuster. Consequently, the adjuster produces relative movement between the receiver and the adjuster. A connector links the support to the adjuster in order to effect simultaneous movement of the support with the relative movement between the receiver and the adjuster. The connector may take the form of a stop, which may be a threaded nut, which is connected to the adjuster and is capable of contacting the support when the adjuster is turned and moved. In any case, the movement of the support exerts a force on the glass floor unit. Such force may cause movement of the glass floor unit from the base and also may change the contour of the walking surface of the glass floor unit by creating a bulge or a dip thereof.

It may be apparent that a novel and useful mechanism for supporting and positioning a glass floor unit relative to a base has been hereinabove described.

It is therefore an object of the present application to provide a mechanism for supporting and positioning a glass floor unit that is relatively simple to install and operate.

Another object of the present invention is to provide a mechanism for supporting and positioning a glass floor unit in which the operation of the mechanism may take place after installation of the glass floor unit in a building or edifice.

Another object of the present invention is to provide a mechanism for supporting and positioning a glass floor unit that is capable of protecting the glass floor unit from deleterious contact with the base.

Another object of the present invention is to provide a mechanism for supporting and positioning a glass floor unit that is capable of altering the surface contour of the glass floor unit once it is installed in a structure.

Another object of the present invention is to provide a mechanism for supporting and positioning a glass floor unit that maintains the prior fire retarding characteristics of the glass floor unit.

Yet another object of the present invention is to provide a mechanism for supporting and positioning a glass floor unit that is capable of achieving a high fire rating.

The application possesses other objects and advantages, especially as concerns particular characteristics and features thereof which will become apparent as the specification continues.

Figure 1:
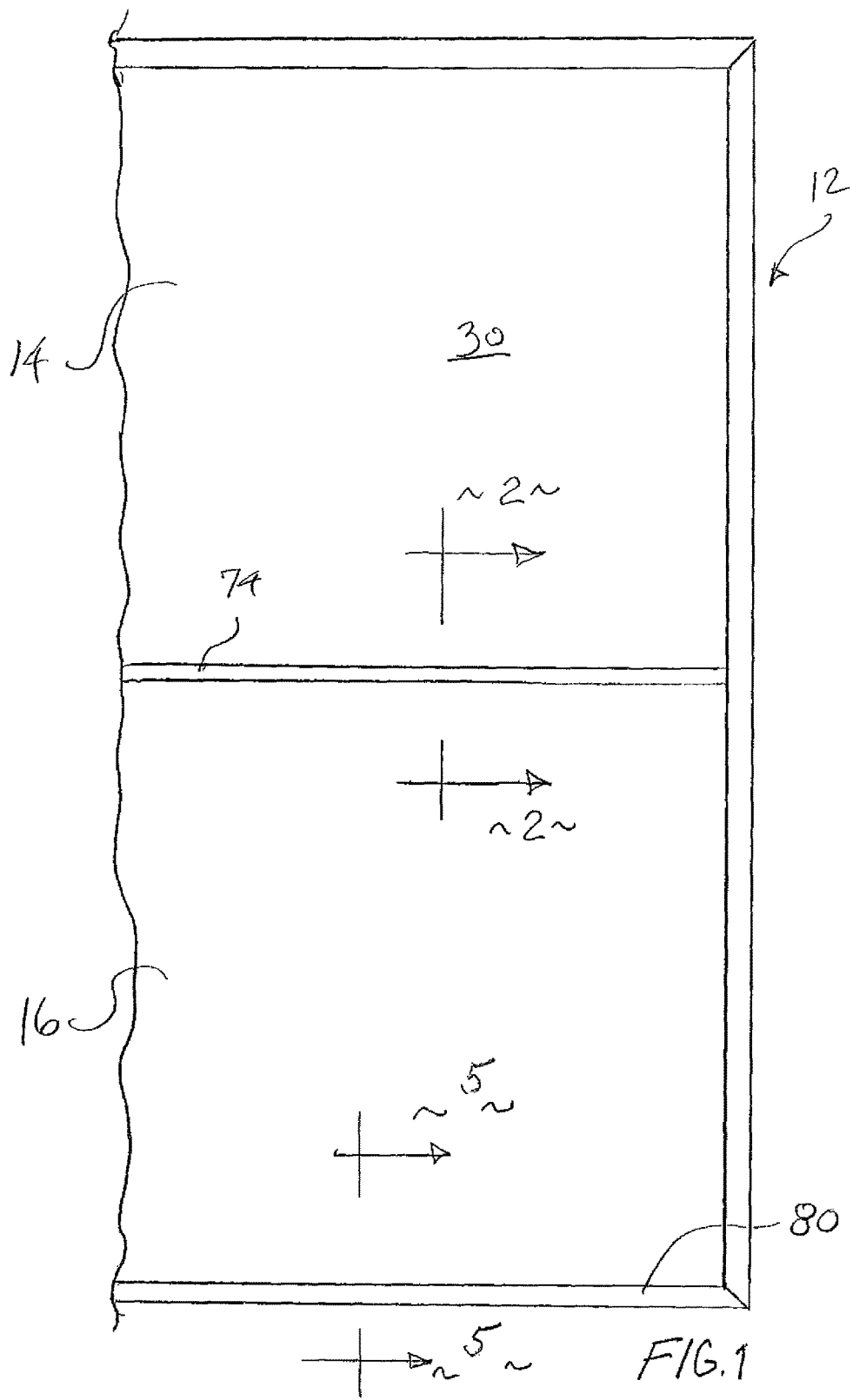
FIG. 1 is a partial top plan view of a building floor having glass floor units installed.

For a better understanding of the invention reference is made to the following detailed description of the preferred embodiments thereof which should be taken in conjunction with the prior described drawings.

DETAILED DESCRIPTION OF THE PREFERRED EMBODIMENTS

Various aspects of the present invention will evolve from the following detailed description of the preferred embodiments thereof which should be referenced to the prior described drawings.

The mechanism of the present application as a whole is depicted in the drawings by reference character 10. Mechanism 10 is used in a floor structure 12. Floor sections 14 and 16 of floor structure 12 represent glass floor units employed with the mechanism of the present application.

Figure 2:
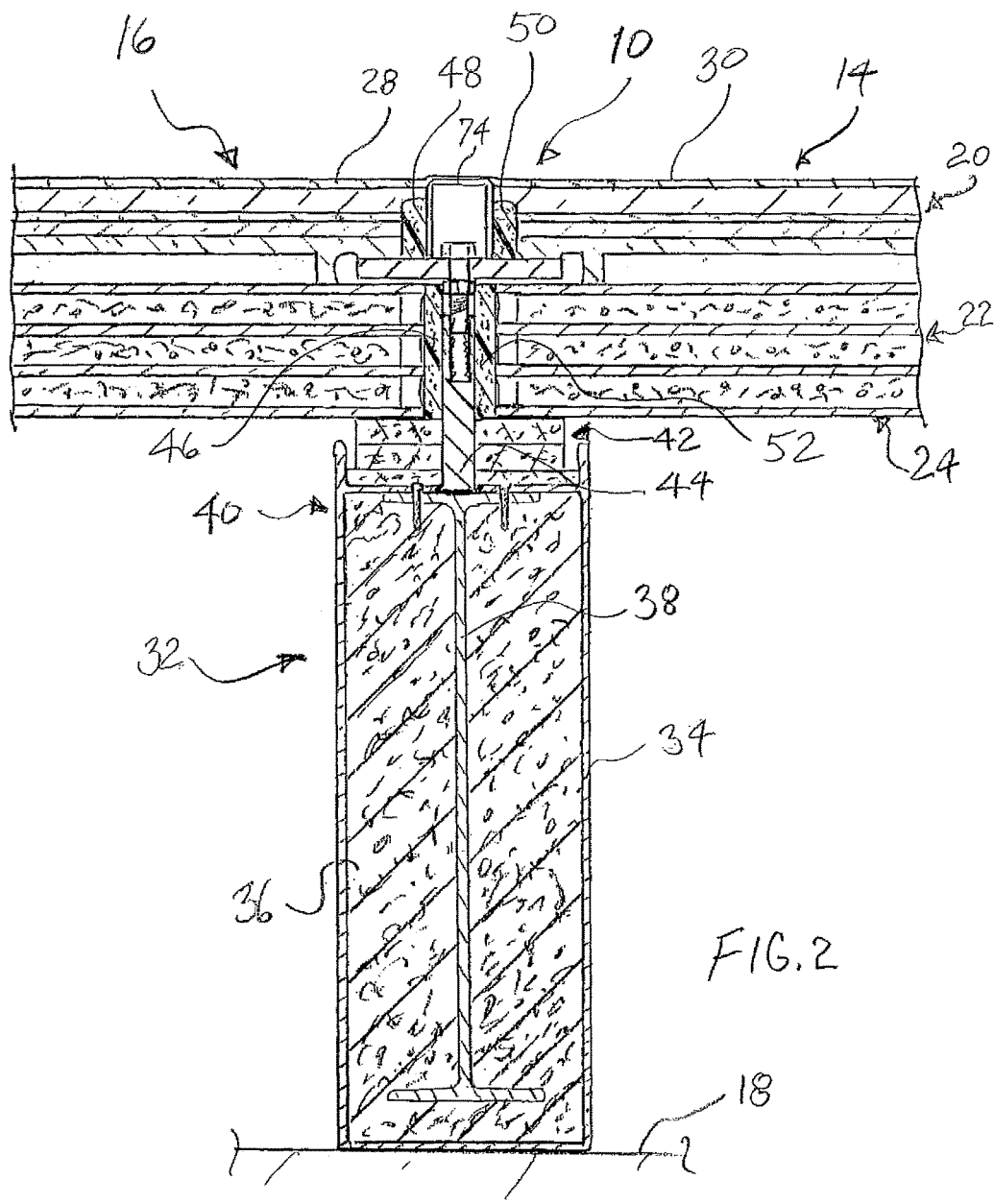
FIG. 2 is a sectional view taken along line 2-2 of FIG. 1.

With reference now to FIG. 2, it may be observed that mechanism 10 is shown in use with glass floor units 14 and 16 relative to a foundation or ground surface 18. It should be noted that glass floor units 14 and 16 are of similar construction. Thus, the following description with respect to glass floor unit 14 also applies to glass floor unit 16. Glass floor unit 14 includes an upper portion 20 which consists of multi-laminate glass of durable construction. Lower or bottom portion 22 is fashioned with fire-rated glass which includes a plurality of glass layers 24 with fire resistant gel layers 26 therebetween. Glass floor units 14 and 16 are available as 120 minute fire rated SL-II-XL units available from Saftifirst of Brisbane, Calif. In addition, a fire-rated fiber tape layer 28 overlies glass floor units 14 and 16 to create a walking surface 30.

The mechanism of the present application is also employed with a base 32 that rests on foundation or ground surface 18. Base 32 is formed with a closure 34 which may be a galvanized metallic container such as one formed of galvanized metal such as Jet Kote. A grout filler 76 lies within closure 34 and encases a metallic beam 38. Beam 38 is stabilized within closure 34 by fasteners 40. A plurality of fire barrier composite blocks 42 lie atop closure 34. Metallic plate 44, which may be composed of steel, is welded to beam 38 and extends upwardly between glass floor units 14 and 16. Foam fillers 46, 48, 50, and 52 lie adjacent the edges of glass floor units 14 and 16. Fillers 46, 48, 50, and 52 may take the form of a material known as Willseal 600 manufactured and distributed by Willseal USA of Hudson, N.H.

Figure 3:
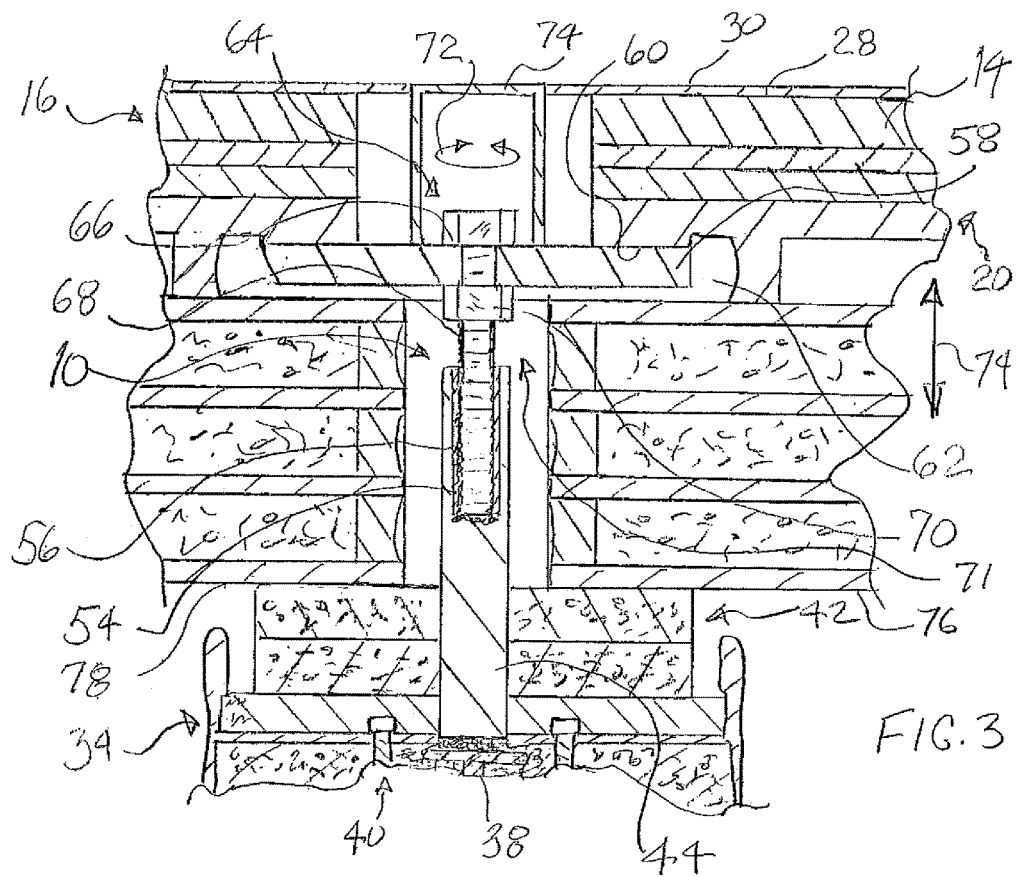
FIG. 3 is an enlarged sectional view of the upper portion of FIG. 2 depicting the adjusting mechanism.

Also depicted in FIG. 2 is mechanism 10 that is shown in more detail on FIG. 3. Mechanism 10 includes a receiver 54 having an internally threaded surface 56. Receiver 54 is generally cylindrical and is welded or otherwise fastened to metallic plate 44. In addition, mechanism 10 includes a support 58 which may be in the form of a flattened or sheet-like member. As shown in FIG. 3, support 58 has extended into contact with the undersurface 60 of upper portion 20 of glass floor unit 14. A cavity 62 within glass floor unit 14 allows the extension of support 58 into this position.

An adjuster 64 is also shown in FIGS. 2 and 3. Adjuster 64 may take the form of a bolt 66 having an external thread 68. Bolt 66 extends through support 58. Nut 70 is fixed to bolt 66 such that bolt 66 and nut 70 are allowed to turn relative to support 58. Thus, nut 70 and bolt 66 serves as a connector 71 linking support 58 to adjuster 64. Needless to say, threaded surface 68 of bolt 66 threadingly engages threaded surface 66 of receiver 54 in this regard. Directional arrow 72 indicates the ability of adjuster 66 to turn. Such turning of bolt 66 in a counter-clockwise direction will exert an upward force on glass floor units 14 and 16 causing an upward deflection of walking surface 30. Likewise, the turning of adjuster bolt 66 in a clockwise direction will tend to cause a slump or depression of walking surface 30. Directional arrow 74 depicts such expansion or depression of walking surface 30 due to the movement of adjuster 64. Needless to say, enough clearance exists to allow support 58 to rotate relative to adjuster 64.

Figure 4:
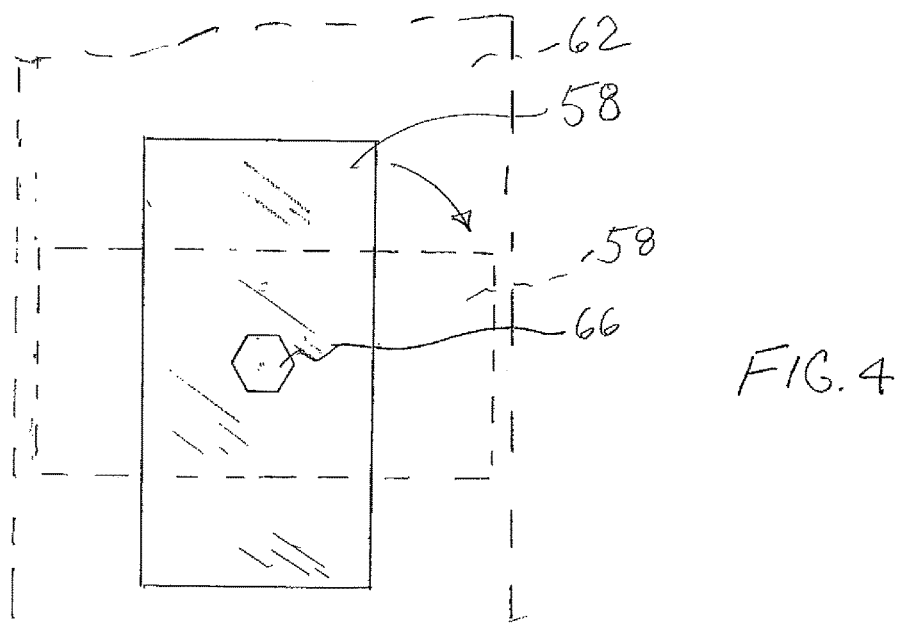
FIG. 4 is a top plan view of the support element of FIGS. 2 and 3 with the movement of the support unit being depicted in phantom.

Turning to FIG. 4, it may be seen that support 58 has been rotated from a position between glass floor units 14 and 16 and out of contact with glass floor units 14 and 16 into a position (in phantom) in contact with glass floor units 14 and 16. Such rotation of support 58 allows the installation of mechanism 10 and the movement of support into the position shown in FIG. 3 for its operation, after placement of glass units 14 and 16 and prior to the installation of foam fillers 46, 48, 50, and 52. A removable overlying hat channel 74 allows a user to gain access to adjuster 66 and, thus, move support 58 relative to and into contact with glass units 14 and 16. It should also be noted that the upward movement of support 58 through the method, heretofore described, will also relieve pressure or stress between bottom surfaces 76 and 78 with composite blocks 42. Such relief of pressure or stress on glass blocks 14 and 16 prevents damage to the same due to forces on walking surface 30 of a normal or abnormal genre.

Figure 5:
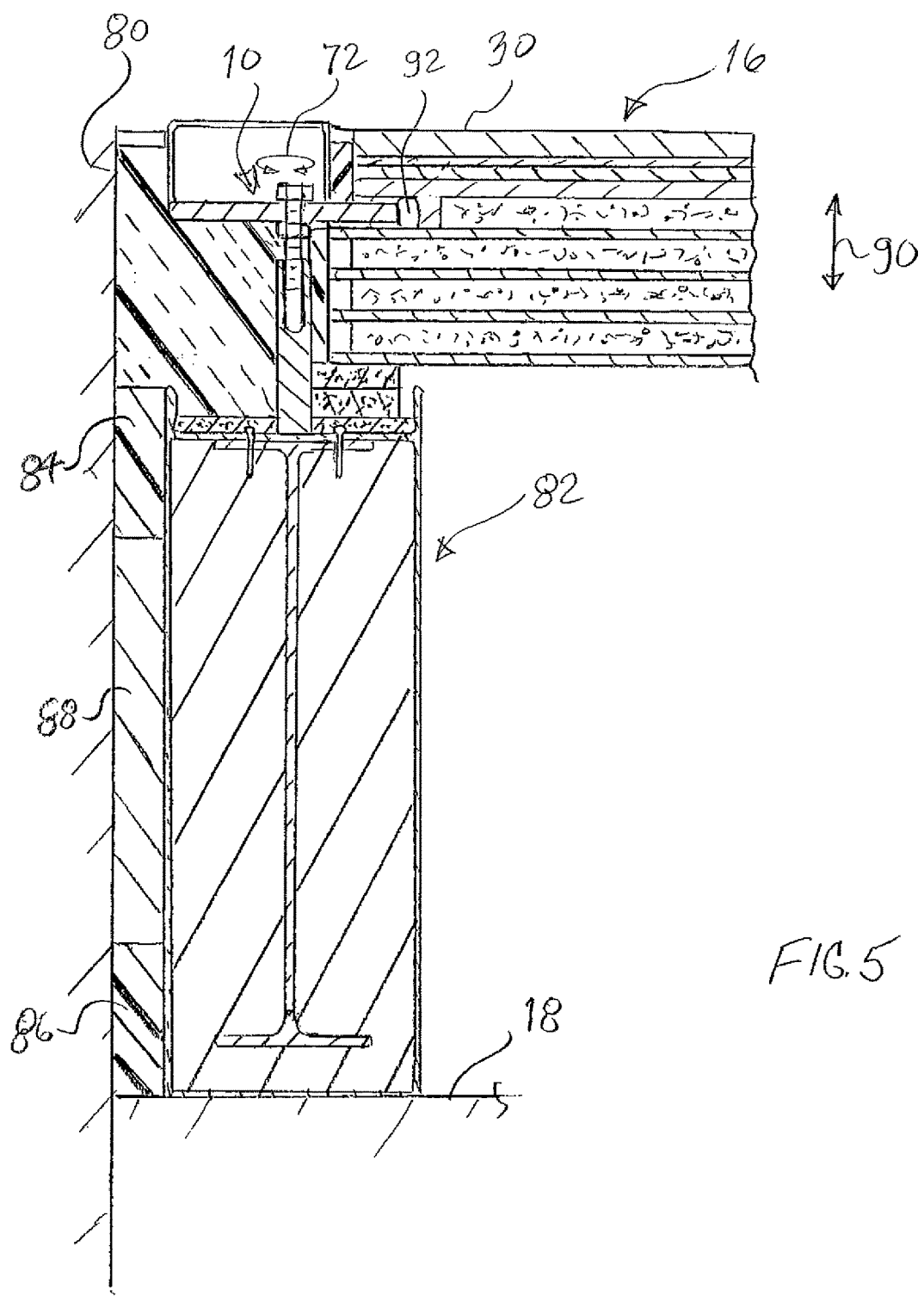
FIG. 5 is a sectional view taken along line 5-5 of FIG. 1.

Viewing now FIG. 5, it may be seen that mechanism 10 is being employed with glass unit 16 against a wall or jam 80. Mechanism 10 is similar to mechanism 10 as depicted in FIGS. 2 and 3. Also, base 82 is similar to base 32 prior described. Foam fillers 84 and 86 of Willseal 600 are employed with shims adjacent well 80. Again, directional arrow 90 indicates the upward or downward pressure or movement on glass floor unit 16 dependent on the operation of mechanism 10 as heretofore described with respect with mechanism 10 found in FIGS. 2 and 3.

In operation, glass floor units are placed on base 32, FIG. 3 or base 82, FIG. 5. To initiate the operation of a mechanism 10, support 58 is rotated into position as shown in FIG. 3 and FIG. 5 from the position indicated in solid line in FIG. 4. In position within cavity 62, FIG. 3 or within cavity 92, FIG. 5, mechanism 10 may be operated specifically by the turning of adjusters 64, directional arrow 72. The turning of adjuster 64 will move bolt 66 upwardly or downwardly relative to base through the threading engagement of exterior threaded surface 68 of bolt 66 with internal thread 56 of receiver 54. Of course, fixed nut 70 contacts support 58 during the upward movement of support 58 during this operation. Glass floor units 14 and 16 will be allowed to travel toward base 32, FIG. 3 or base 82, FIG. 5 or lifted therefrom according to directional arrow 74, FIG. 3, or directional arrow 90, FIG. 5. Walking surface 30 will then be either bowed or depressed to a degree through the operation of mechanism 10.

While in the foregoing, embodiments of the present application have been set forth in considerable detail for the purposes of making a complete disclosure of the application. Numerous changes may be made in such details without departing from the spirit and the principles of the invention sought for patenting.

What is claimed is:

1. A mechanism forming a floor structure resting on a foundation, comprising:
   a glass floor unit;
   a base, said base positioned to contact the foundation and extending therefrom without relative movement between said base and the foundation;
   a support, said support positioned to contact the glass floor unit;
   a receiver, said receiver configured for extension from said base and fixation to said base to prevent relative movement between said receiver and said base;
   an adjuster, said adjuster configured to interact with said receiver and to produce relative movement between said receiver and said adjuster; and
   a connector, said connector linking said support to said adjuster to effect simultaneous movement of said support with said relative movement between said receiver and said adjuster, said movement of said support exerting a force on said glass floor unit to effect relative movement between said glass floor unit and said base contacting said foundation.

2. The mechanism of claim 1 in which said receiver comprises one threaded portion.

3. The mechanism of claim 2 in which said adjuster comprises another threaded portion, said one threaded portion of said receiver threadingly engaging said another threaded portion of said adjuster to produce said relative movement between said receiver and said adjuster.

4. The mechanism of claim 1 in which said base comprises a beam and a plate connected to said beam, said receiver being connected to said plate.

5. The mechanism of claim 4 in which said beam, plate, and receiver comprise metallic members, said beam being connected to said plate including one weld and said receiver being connected to said plate including another weld.

6. The mechanism of claim 4 in which said receiver comprises one threaded portion.

7. The mechanism of claim 1 in which said adjuster comprises another threaded portion, said one threaded portion of said receiver threadingly engaging said another threaded portion of said adjuster to produce said relative movement between said receiver and said adjuster.

8. The mechanism of claim 1 in which said glass floor unit includes a cavity and said support comprises a sheet, said sheet being rotatable relative to said adjuster for movement within the cavity of said glass floor unit.

9. The mechanism of claim 8 in which said receiver comprises one threaded portion.

10. The mechanism of claim 9 in which said adjuster comprises another threaded portion, said one threaded portion of said receiver threadingly engaging said another threaded portion of said adjuster to produce said relative movement between said receiver and said adjuster.

11. The mechanism of claim 10 in which said base comprises a beam and a plate connected to said beam, said receiver being connected to said plate.

12. The mechanism of claim 11 in which said beam, plate, and receiver comprise metallic members, said beam being connected to said plate including one weld and said receiver being connected to said plate including another weld.

\* \* \* \* \*

(12) POST-GRANT REVIEW CERTIFICATE (240th)

United States Patent
O'Keeffe

(10) Number: US 9,926,709 J1
(45) Certificate Issued: Sep. 26, 2022

(54) MECHANISM FOR SUPPORTING AND POSITIONING A GLASS FLOOR UNIT

(71) Applicant: William F. O'Keeffe

(72) Inventor: William F. O'Keeffe

(73) Assignee: O'KEEFFE'S INC.

Trial Number:

PGR2019-00025 filed Dec. 26, 2018

Post-Grant Review Certificate for:

Patent No.: 9,926,709
Issued: Mar. 27, 2018
Appl. No.: 15/200,956
Filed: Jul. 1, 2016

The results of PGR2019-00025 are reflected in this post-grant review certificate under 35 U.S.C. 328(b).

POST-GRANT REVIEW CERTIFICATE
U.S. Patent 9,926,709 J1
Trial No. PGR2019-00025
Certificate Issued Sep. 26, 2022

AS A RESULT OF THE POST-GRANT REVIEW PROCEEDING, IT HAS BEEN DETERMINED THAT:

Claims 1-12 are cancelled.

\* \* \* \* \*